United States Patent
Pall et al.

(10) Patent No.: US 7,962,426 B2
(45) Date of Patent: Jun. 14, 2011

(54) ROLE/PERSONA BASED APPLICATIONS

(75) Inventors: Gurdeep S. Pall, Medina, WA (US); Jeffrey S. Raikes, Seattle, WA (US); Alexander G. Gounares, Kirkland, WA (US); Ajitesh Kishore, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 765 days.

(21) Appl. No.: 11/958,739

(22) Filed: Dec. 18, 2007

(65) Prior Publication Data
US 2009/0157570 A1    Jun. 18, 2009

(51) Int. Cl.
G06F 17/00 (2006.01)
G06N 5/02 (2006.01)

(52) U.S. Cl. .......................... 706/11; 706/48

(58) Field of Classification Search ............. 706/11
See application file for complete search history.

(56) References Cited

U.S. PATENT DOCUMENTS

| | | | | |
|---|---|---|---|---|
| 6,954,738 | B2 * | 10/2005 | Wang et al. | 705/59 |
| 7,028,009 | B2 * | 4/2006 | Wang et al. | 705/51 |
| 7,107,269 | B2 | 9/2006 | Arlein et al. | |
| 7,206,765 | B2 * | 4/2007 | Gilliam et al. | 705/51 |
| 7,702,758 | B2 * | 4/2010 | Shrivastava et al. | 709/220 |
| 2004/0122822 | A1 | 6/2004 | Thompson et al. | |
| 2004/0181539 | A1 | 9/2004 | Munson et al. | |
| 2006/0010118 | A1 | 1/2006 | Sattler et al. | |
| 2006/0047657 | A1 | 3/2006 | Frieder et al. | |
| 2006/0277089 | A1 | 12/2006 | Hubbard et al. | |
| 2007/0083554 | A1 | 4/2007 | Crume | |
| 2007/0129979 | A1 | 6/2007 | Kumagai et al. | |
| 2007/0156629 | A1 | 7/2007 | Fischer | |

OTHER PUBLICATIONS

Role-Based Templates for SharePoint My Sites http://office.microsoft.com/en-us/sharepointserver/HA102147321033.aspx. Last accessed Aug. 13, 2007.
Javed Sikander. Building Office Business Applications a new breed of business applications built on the 2007 Microsoft Office system. Jun. 2006 http://www.3sharp.com/pdf/Building_Office_Business_Applications.pdf. Last accessed Aug. 13, 2007.
How Can Mid-Market Companies Benefit From Roles-Based Processing? 2006 FSN Publishing Limited. http://www.fsn.co.uk/channel_mid_range_accounting/wp_how_can_mid_market_companies_benefit_from_roles_based_processing.htm. Last accessed Aug. 13, 2007.
Role Based Dashboards http://www.atlantic-ec.com/executive-dashboards.html. Last accessed Aug. 13, 2007.

* cited by examiner

*Primary Examiner* — Michael Holmes
(74) *Attorney, Agent, or Firm* — Lee & Hayes, PLLC

(57) ABSTRACT

The claimed subject matter provides a system and/or a method that facilitates managing data within an environment. An interface component can receive a role-based model reflective of at least one position within an environment, wherein the environment includes two or more entities within an organized hierarchy. The role-based model can include at least one role assigned to an entity in which the assignment is indicative of the position of the entity within the environment. A role component can provide data access to the entity within the environment in accordance with the role assigned to such entity.

17 Claims, 10 Drawing Sheets

ROLE/PERSONA BASED APPLICATIONS

BACKGROUND

Technological advances in computer hardware, software and networking have lead to increased demand for electronic information exchange rather than through conventional techniques such as paper correspondence, for example. Such electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

In light of such technological advances, people in general tend to be more and more concerned about being connected and/or available for various communications such as cell phone calls, text messages, emails, instant messages, land line phone calls, voice mails, files, data, etc. Connectivity is generally associated with receiving data in an efficient manner. Yet, with the growth of companies, businesses, enterprises and the like, disseminating information in an efficient manner has become a hassle in light of the massive quantities of information that need to be communicated to large groups of people. For example, an email indicating a new protocol for a business procedure can be transmitted to employees. If the email is not communicated to the appropriate individuals, the effectiveness of the email and enforcement of the protocol can suffer greatly.

In general, distributing information efficiently is greatly hinged upon individuals identifying appropriate recipients. Information is plentiful in light of vast number of data communication modes available and optimizing information communication to individuals increases efficiency and reduces redundancy. Conventional techniques such as, email aliases, distribution groups, web sites, newsletters, memos, and the like have been used to communicate information. Yet, such techniques require accurate identification of recipients which is error-prone. Moreover, as some may be inadvertently excluded from receiving information, some may receive information that is not relevant to him or her which can further hinder productivity by providing unnecessary distractions.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate implementing data access within an environment based upon a role with at least one defined right. A role component can enforce data access within an environment based upon a role assigned to an entity. In other words, the role component can enable seamless data interaction, distribution, and access in accordance with an entity's assigned role within the environment. The role can be indicative of a position or status associated with the entity within the environment. In general, the role can correspond to a position or status with correlating rules, rights, or privileges that can be utilized within the environment for various entities and/or users. The role component can further allow multiple users or entities to share or log into a role for seamless data distribution, sharing, and/or access. Thus, data can be uniformly available to entities sharing a role.

In accordance with an aspect of the subject innovation, the role component can utilize an evaluation component that can automatically evaluate the environment in order to generate a role-based model that includes a role layout or structure. The role component can assign entities to the various roles within the role-based model and provide data access or interaction based on such model. Moreover, the role-based model automatically created can be manually configured, changed, and/or updated. In other aspects of the claimed subject matter, methods are provided that facilitates evaluating an environment to identify at least one role utilized for data accessibility.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
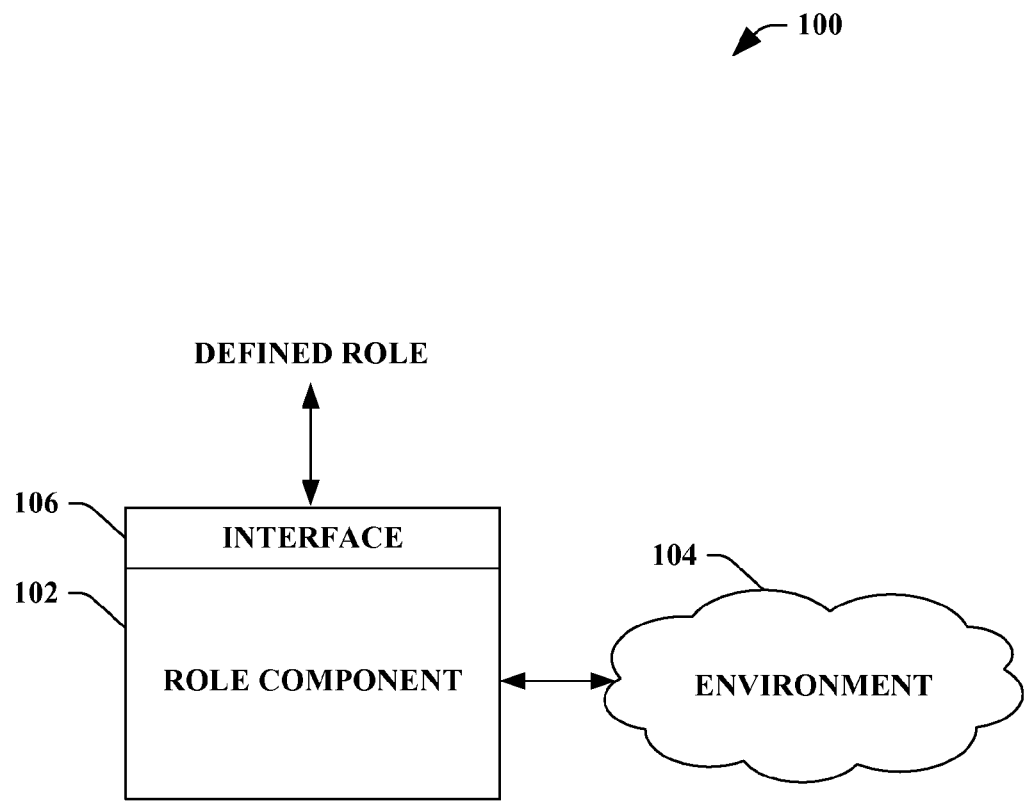
FIG. 1 illustrates a block diagram of an exemplary system that facilitates implementing data access within an environment based upon a role with at least one defined right.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "model," "environment," "entity," "cloud," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates implementing data access within an environment based upon a role or persona with at least one defined right. The system 100 can include a role component 102 that can receive a defined role or persona via an interface component 106 (herein referred to as "interface 106"), wherein the role component 102 can provide data access and/or data workflow to an environment 104 based at least in part upon the defined role or persona. In particular, the defined role can include at least one right, privilege, or rule in which the role component 102 utilizes for data access. The defined role or persona can correspond to a position or status within the environment 104 in which the rights, privileges and/or rules associated with the defined role or persona emulate the position or status within such environment 104. In general, by providing data access based on a defined role, multiple users assigned to a role (e.g., users with common status or positions) can access data in a seamless manner between one another which greatly enhances data dissemination within the environment 104.

For example, a role or persona can be configured for each position or status associated with an office environment. The role or persona can include respective rights and assignments that define data access for users or entities within the office environment. For instance, the office environment can include positions such as a secretary, an assistant, a first year employee, a manager, a partner, and a managing partner. A role or persona can be associated with each position which includes data access and/or rights for each individual or entity assigned to such role or persona. In other words, data associated with the office environment can be accessed or utilized by a user based on the role or persona assigned therewith. If a user is assigned to the first year employee role, data within the office environment can be accessed, distributed, and/or utilized based on such role. In a specific example, communications (e.g., previous, current, future, etc.) related to the first year employee status or role can be accessed by the user assigned to such role. Therefore, the office environment and employees associated therewith can interact with data in a seamless manner that ensures individuals with substantially similar statuses and positions (e.g., thus assigned to a role) can view and/or utilize data. It is to be appreciated that a role can include data access or rights that overlap with a disparate role or a role can be within a role. For instance, a boss role can include an employee role, wherein the rights of a boss can include the rights of an employee (e.g., but the employee rights do not include the rights associated with the boss).

The defined role or persona for the environment 104 can be generated automatically (e.g., discussed in more detail in FIG. 2), manually, and/or any other suitable combination thereof. In one example, a role-based model can be created by an entity (e.g., user, machine, company, business, enterprise, group of users, etc.) with specific rights and privileges. Moreover, the entities associated with the environment 104 can be assigned to the created roles, wherein assignment to a role can correspond to the entity position or status related to the environment 104. In other words, the role and associated rights can be representative of a position or status within the environment. It is to be appreciated that the position or status within the environment 104 can be any suitable rank or tier related to a hierarchical organization of entities within such environment. Moreover, the position or status can be a specific subset or grouping of entities within the environment 104 with at least one common characteristic. It is to be further appreciated that the environment 104 can be any suitable collection of entities (e.g., user, device, machine, group, department, business, etc.) that can be organized in a particular manner. For example, the environment 104 can be a business, company, a network, an enterprise, a social network, a home, a server, an application, a machine, a device, and/or any other environment that can be partitioned into a subset having similar position or status. Furthermore, it is to be appreciated that a "role" or a "persona" are utilized interchangeably and such terms are to refer to any collection of entities assigned thereto having uniform rights for data access in relation to the environment 104.

In another example, a family environment (e.g., network, family computer, etc.) can include positions or statuses such as a child, a guest, a babysitter, and a parent, wherein a role can be defined for each position. Therefore, a parent role can enable a user (e.g., a mother, a father, a step mother, a step father, a legal guardian, etc.) to log in for data access in accordance with the defined role within the family environment. Furthermore, a babysitter role can enable multiple babysitters to access data associated with such 'babysitter' role so that information necessary for babysitters can be seamlessly accessed or utilized. In addition, the family environment can include various devices, components, applications, and the like which can leverage the defined roles for enhanced operation. For example, a parent role can include a high clearance for data access based on being a high position in the family environment hierarchy.

In addition, the system 100 can include any suitable and/or necessary interface 106, which provides various adapters, connectors, channels, communication paths, etc. to integrate the role component 102 into virtually any operating and/or database system(s) and/or with one another. In addition, the interface 106 can provide various adapters, connectors, channels, communication paths, etc., that provide for interaction with the role component 102, the environment 104, a defined role, and any other device and/or component associated with the system 100.

Figure 2:
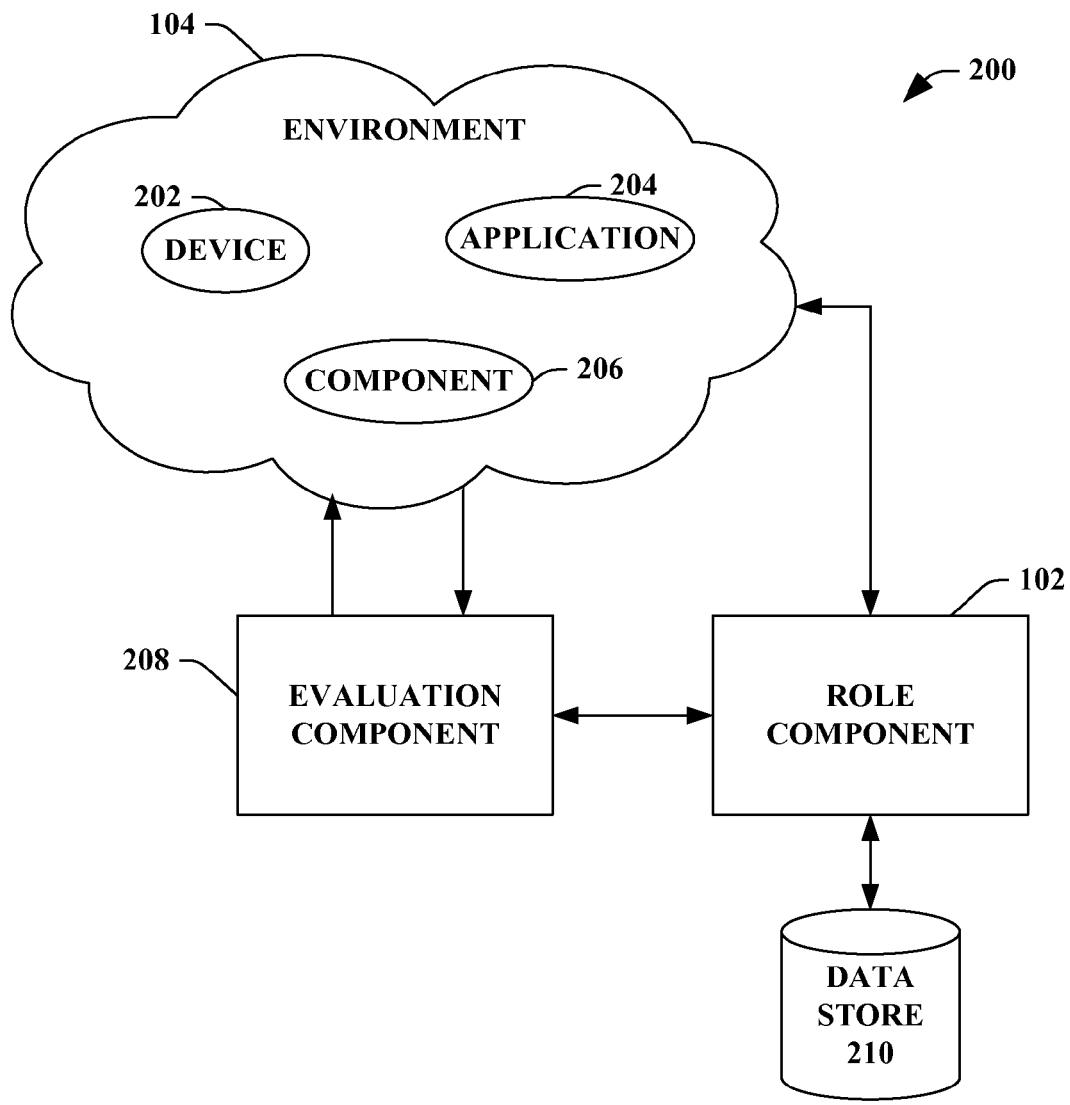
FIG. 2 illustrates a block diagram of an exemplary system that facilitates evaluating an environment to identify at least one role utilized for data accessibility.

FIG. 2 illustrates a system 200 that facilitates evaluating an environment to identify at least one role utilized for data accessibility. The system 200 can include the role component 102 that can provide role-based data access in which a role can correlate to a position or a status within the environment 104. The role component 102 can enable a user to log into a defined role rather than logging into the environment 104 as an individual identity. Moreover, the defined role can include rights, rules, and/or privileges that can be uniformly applied to any users or entities assigned to the defined role. For instance, a defined role can mirror a position or status within the environment 104 to enable users associated with such position or status can seamlessly interact and/or access data. It is to be appreciated that the role component 102 can assign current and/or future users or entities into roles to allow information or data to be communicated within the environment 104.

For example, a role can be created that correlates to a position within the environment 104. If a first user is assigned to such role and departs (e.g., retires, receives a raise, selects alternative employment, etc.), a second user (e.g., the user who replaces the first user's position) can be assigned to the role to enable data access for any data connected to such role. Therefore, data communications (e.g., emails, voicemails, calendar data, contact information, websites, bookmarks, business contacts, applications, department information, company information, protocols, handbook information, etc.) can be seamlessly handed-off from the first user to the second user based on employing the role.

The environment 104 can include various entities, users, and the like, wherein positions and/or statuses within the environment can be identified as potential roles. In particular, the environment 104 can include a device 202, an application 204, and/or a component 206 that can leverage at least one role utilized by the role component 102 for enhanced operation. For example, the role can include definitions (e.g., rights, privileges, and rules with respective user assignments) that can be applied for at least one of data access within the environment 104 and/or interaction with one of the device 202, the application 204, or the component 206.

The system 200 can include an evaluation component 208 that can analyze the environment 104 in order to generate a role-based model. The role-based model can be indicative of positions or statuses identified within the environment 104 based on the analysis. Moreover, the evaluation component 208 can automatically assign entities within the environment 104 to the generated roles and configure such roles with rules, rights, and/or privileges. In one example, the evaluation component 208 can automatically create roles (having rules/rights/privileges), assign users/entities to such roles, and enable manual editing of such automatic configurations. In other words, the automatically created roles and assignments can be edited based on user preference in order to employ a user-tailored role-based model.

The system 200 can further include a data store 210 that can include any suitable data related to the role component 102, the environment 104, defined roles, etc. For example, the data store 210 can include, but not limited to including, roles, positions, statuses, environment characteristics, user assignments, role rights, role settings, user preferences, analysis data from examination of the environment, user-defined roles, role-based model corresponding to an environment, a role layout, and/or any other suitable data associated with the 200. Moreover, it is to be appreciated that the data store 210 can be a stand-alone component (e.g., as depicted), incorporated into the role component 102, incorporated into the evaluation component 208, incorporated into the environment 104, and/or any suitable combination thereof.

It is to be appreciated that the data store 210 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 210 of the subject systems and methods is intended to comprise, without being limited to, these and any other suitable types of memory. In addition, it is to be appreciated that the data store 210 can be a server, a database, a hard drive, a pen drive, an external hard drive, a portable hard drive, and the like.

Figure 3:
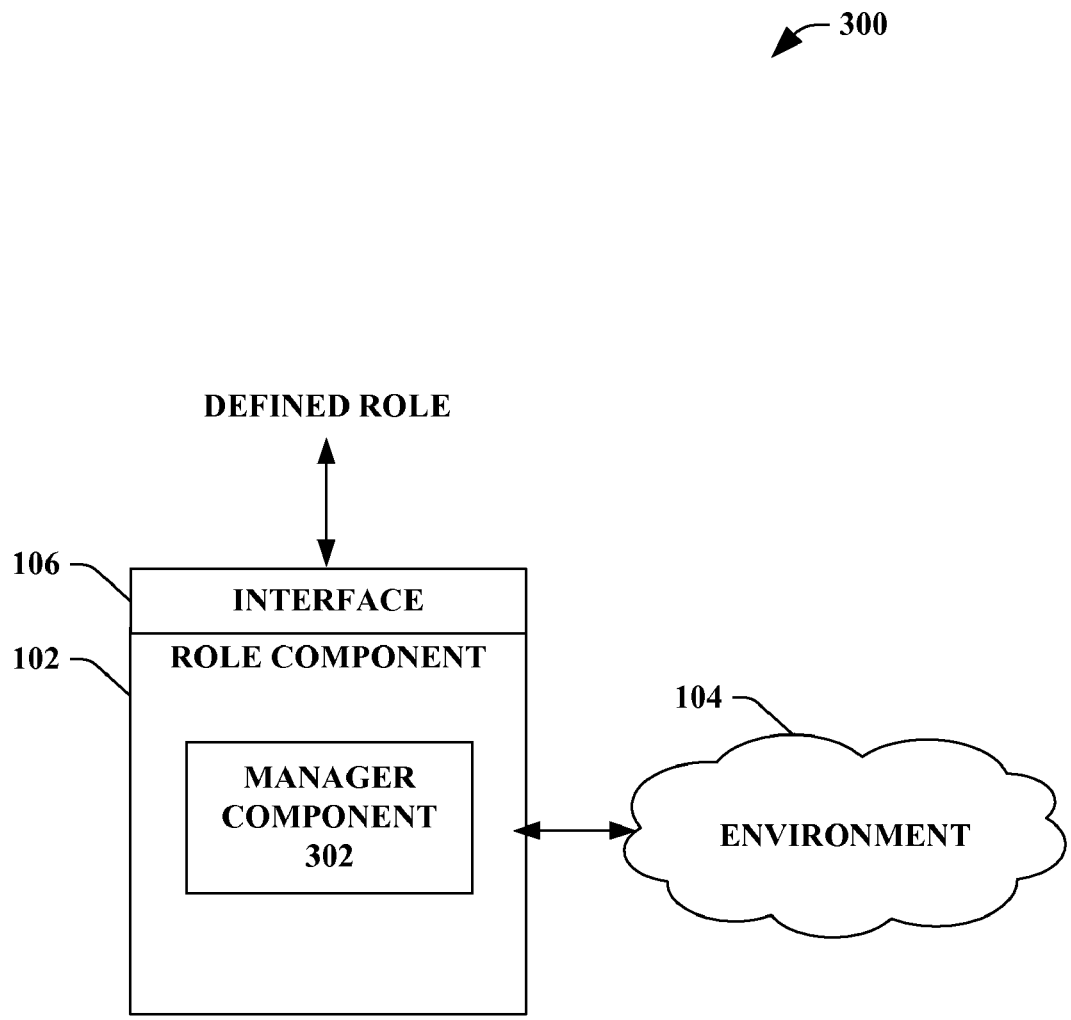
FIG. 3 illustrates a block diagram of an exemplary system that facilitates managing a role associated with a subset of entities within an environment.

FIG. 3 illustrates a system 300 that facilitates managing a role associated with a subset of entities within an environment. The system 300 can include the role component 102 that can receive a defined role to implement for data access within the environment 104. In particular, the defined role can include a right associated with data access and an assignment to at least one entity within the environment 104. Based on such definitions of the role, an entity can utilize and/or interact with the environment 104 accordingly. Moreover, it is to be appreciated that the role can be enable seamless data interaction between a plurality of entities assigned to a role. Thus, data, data communications, applications, and the like can be uniformly accessible to a plurality of users assigned to a common role. On the contrary, typical systems and/or environments require entities to log into and access data on an identity basis. Yet, the subject innovation enables a user to log into a general role rather than an individual identity, which enhances data distribution and/or access.

The system 300 can utilize a manager component 302 that enables a role or role-based model to be configured and/or edited. For example, the manager component 302 can enable a user or entity to re-organize a role structure (e.g., a role layout, a role-based model for an environment, etc.). In another example, the manager component 302 can enable assignments for the roles to be manipulated or changed. Thus, a role with user A, user B, and user C assigned thereto can be changed so user C is assigned to a different role. The manager component 302 can further provide a right associated with a role to be updated, changed, or configured. In still another example, the organization or hierarchy of roles can be managed in order to reflect the environment 104 in a more accurate manner or based on user preferences. For instance, a role can be created that enables full data access for the environment 104 even though such position or status may not exist.

The role component 102 can utilize a role to tag data so people/users know what is theirs and what belongs to the environment 104 (e.g., company, home, business, etc.) or what belongs to one project versus another project. The role component 102 can employ a role that captures a state associated with an entity or user, wherein a disparate user or person can get up to speed that much faster by logging into such role, wherein information can be passed from one user to another based on such role. This can include using role data to step into multiple roles and share data, in which a workspace can be associated with a role. For example, in a hospital, there can be a doctor role and a nurse role which can include context such as, time of day, data, department, etc. In another instance, the role can be employed for data communication such as chat, social networks, email, applications, instant messaging applications, video chat, audio chat, etc. It is to be appreciated that data can be interpreted in the substantially same way no matter which role a user is logged into. Moreover, a role can include multiple people or users associated therewith and/or a role can be filled by different individuals or entities. In another example, the role component 102 can visually tag data based on a role or persona.

The role component 102 can tag data automatically with identified context based on the role accessing or interacting with such data. In another example, the role component 102 can track and/or manage transitions for specific users logging into multiple roles. For instance, user A can be in an employee role at work (e.g., environment 1) and in a parent role at home (e.g., environment 2). In such example, the role component 102 can track and/or manage such role transition for user A. The role component 102 can receive a role-based model via the interface 106, wherein such model can determine context, identify a role, identify a right with a role, assign an entity to a role, pre-determine what a role is for an entity, make a role inherent without adding burden to individual to select or choose a role, etc. In another example, advertisements can be targeted to specific roles based on characteristics associated therewith (e.g., details of the position or status reflected by the role, environment, context of role, user assigned to the role, etc.).

The role component 102 can further utilize role information in connection with security concerns such as, but not limited to, managing financial transactions, being more aware of data having links that track data, combining social networking security issues with marketing issues of tracking/selling data, etc. The role component 102 can further identify workflow in workplace including, for instance, hours, facilities, departments, etc. which can trigger applications and/or tasks automatically. In still another example, the role component 102 can leverage various networks (e.g., social networks, web sites, forums, servers, etc.) which can provide role-based models utilized by other environments or default environments created. Such networks can indicate optimized roles, best practices, rights, assignments, etc. for specific environments It is to be appreciated that the subject innovation can consider large groups that comes together under a joint standard (e.g., mergers, acquisitions, company buy outs, consolidation, etc.), inspect a state of workflow going across environments, tracking problems across environments, and the like.

Figure 4:
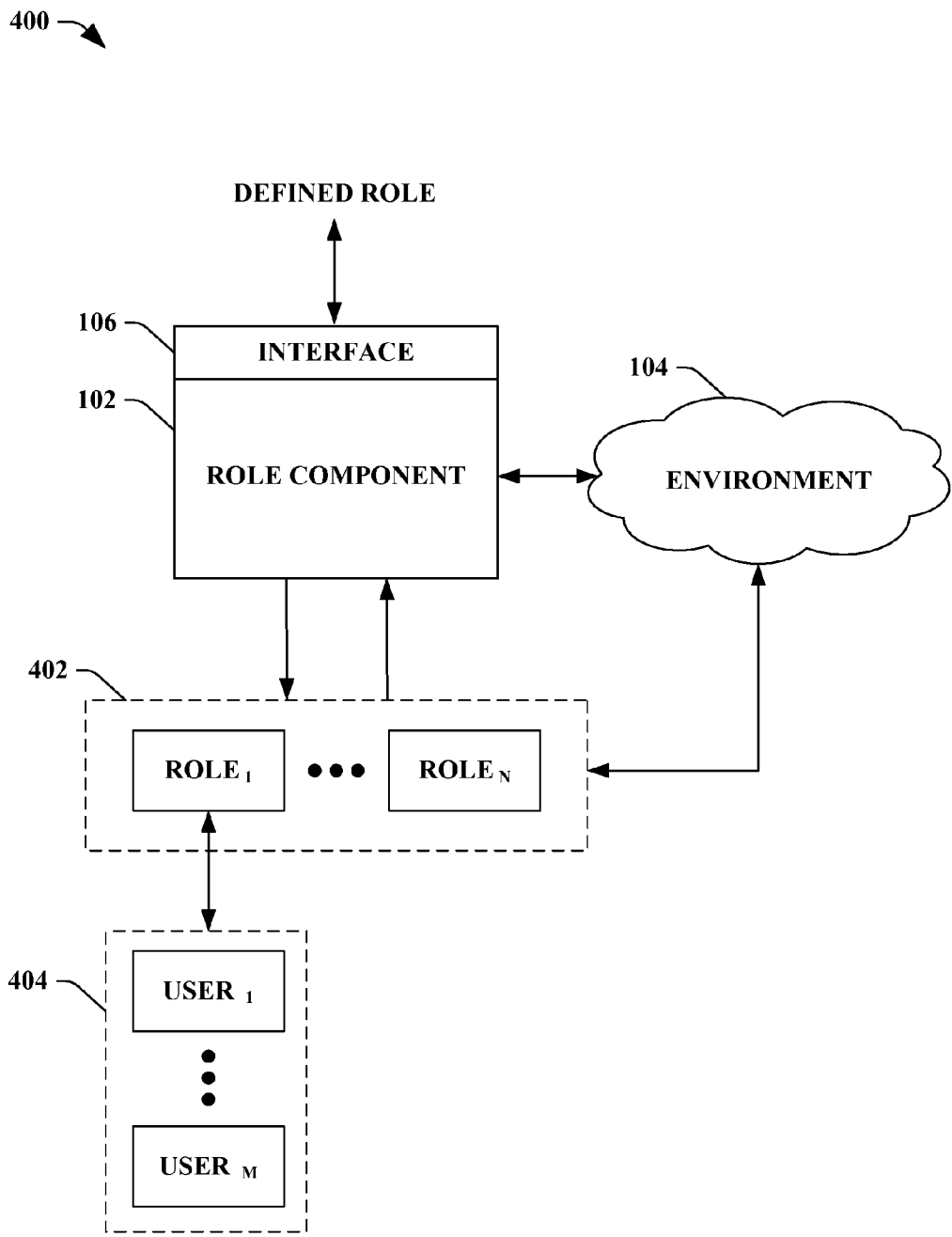
FIG. 4 illustrates a block diagram of an exemplary system that facilitates employing a plurality of roles within an environment for data access.

FIG. 4 illustrates a system 400 that facilitates employing a plurality of roles within an environment for data access. The system 400 can include the role component 102 that can provide seamless data interaction between two or more entities associated with the environment 104 based upon logging into a specific role or persona. In other words, the environment 104 can include various statuses, positions, or groupings that can be aggregated into a role or persona in which entity assignment can be employed. Based on an entity being assigned to a role that correlates to a position, status, or subset (e.g., group, etc.), data access and interaction can be enforced. Furthermore, it is to be appreciated that the role, persona, defined role, or role-based model can be created manually, automatically, and/or any suitable combination thereof.

The role component 102 can employ a plurality of roles 402 to base data access within the environment 104. For instance, there can be any suitable number of roles such as $role_1$ to $role_N$, where N is a positive integer. Moreover, for each role, there can be any suitable number of users assigned thereto. Thus, there can be any suitable number of users assigned to each role, such as $user_1$ to $user_M$, where M is a positive integer. It is to be appreciated that a user assigned to a role can be re-assigned to various other roles and/or include assignment to multiple roles. In other words, a user can be assigned to a first role then re-assigned to a second role, and then added to a third role (e.g., user is assigned to second and third role).

Figure 5:
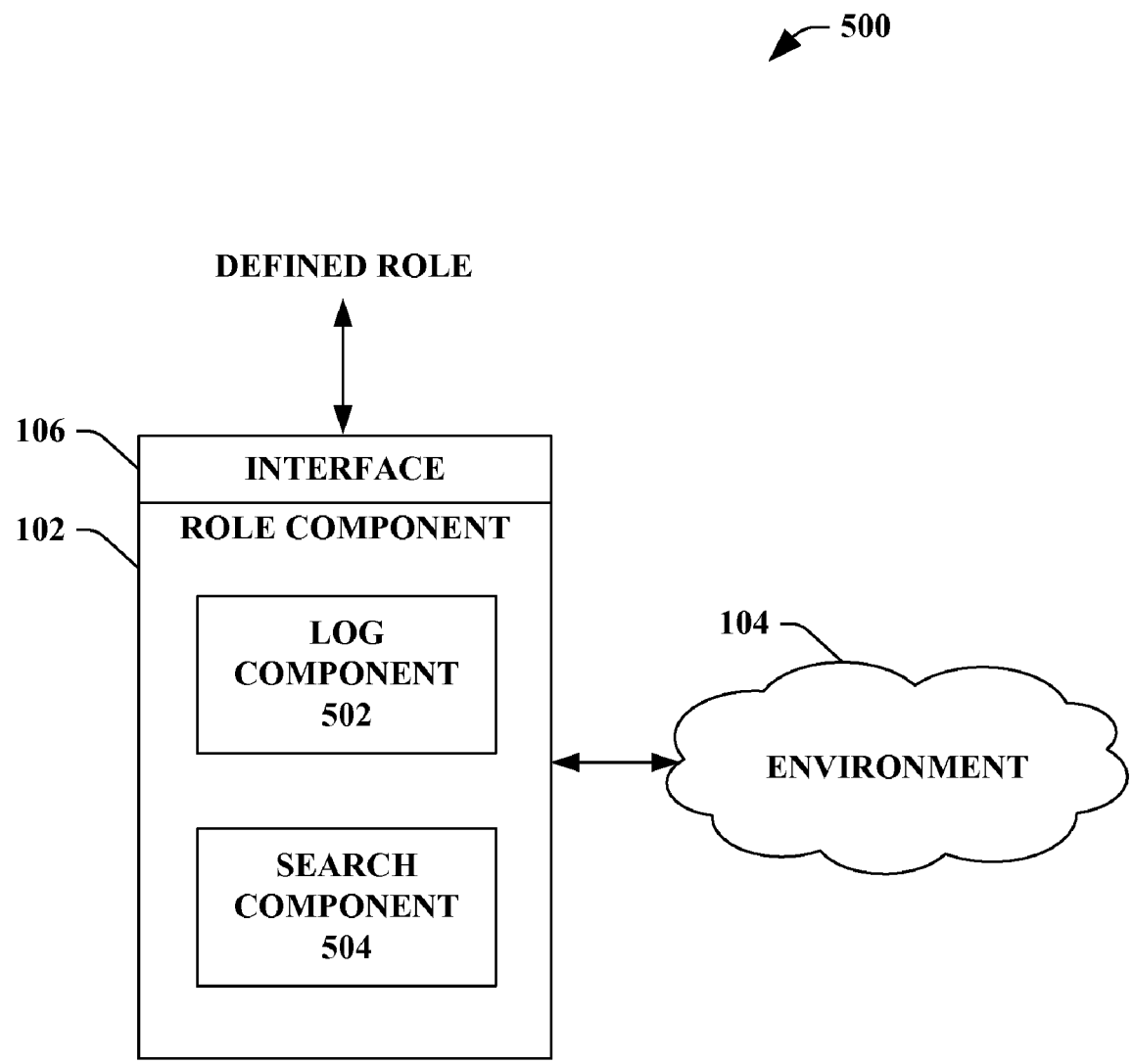
FIG. 5 illustrates a block diagram of exemplary system that facilitates tracking or searching data associated with a role within an environment.

FIG. 5 illustrates a system 500 that facilitates tracking or searching data associated with a role within an environment. The role component 102 can employ at least one role that defines data access for the environment 104, wherein the role can include rights and/or privileges that correlate with a position or status for entities within the environment 104. The role component 102 can utilize a log component 502 that tracks data in accordance with the claimed subject matter. In particular, the log component 502 can track and/or monitor data related to roles, user log in, user log out, data access, statuses within the environment 104, positions within the environment 104, defined roles, role transitions, automatically identified roles, rights associated with a role, privileges associated with a role, and/or most any suitable data related to the system 500. For example, the log component 502 can track data access and/or interaction for a user logged into a specific role in order to provide an accurate history of user's data access within the environment for certain roles. Moreover, the log component 502 can store the logged entries in a data store (not shown but discussed in FIG. 2).

Furthermore, the role component 102 can include a search component 504 that can conduct searches of any suitable data related to the system 500. In other words, the search component 504 can be any suitable search engine that can search environment data, role associated data, rights, privileges, user data, entity data, position data, status data, remote data, local data, and/or any suitable combination thereof in order to satisfy a received query. For example, a user can search the system 500 with the search component 504 in order to identify roles assigned to a particular individual within the environment 104. In another example, the role-based layout or model can be queried in order to identify hierarchical characteristics or organizational traits (e.g., granular layout, parent-child relationship, etc.).

Figure 6:
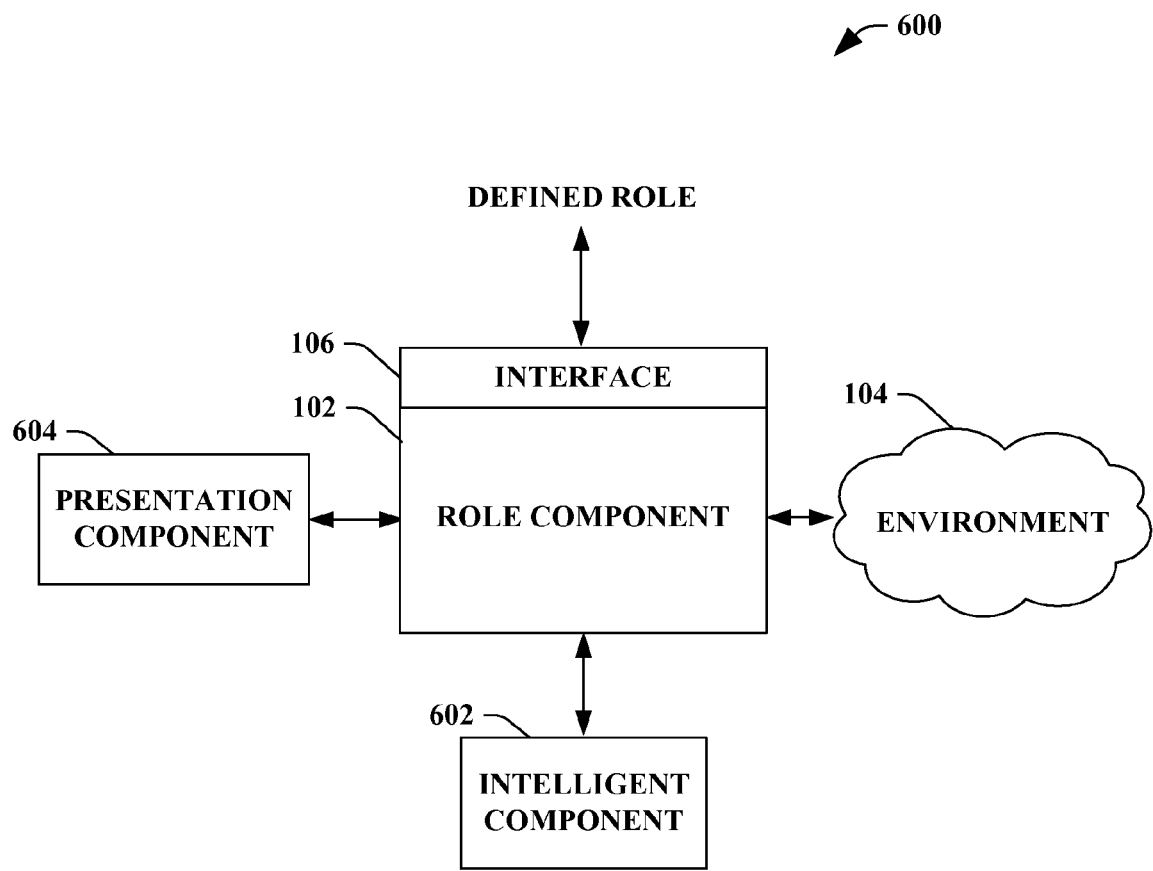
FIG. 6 illustrates a block diagram of an exemplary system that facilitates utilizing a role and respective right for data access within an environment.

FIG. 6 illustrates a system 600 that employs intelligence to facilitate utilizing a role and respective right for data access within an environment. The system 600 can include the role component 102, the environment 104, and the interface 106. It is to be appreciated that the role component 102, the environment 104, and the interface 106 can be substantially similar to respective components, environments, and interfaces described in previous figures. The system 600 further includes an intelligent component 602. The intelligent component 602 can be utilized by the role component 102 to facilitate enforcing data access for the environment 104 based on assigned roles reflective of an environment position or status. For example, the intelligent component 602 can infer roles, role layout for an environment, user/entity assignment to roles, role rights or privileges for data, role-based model for an environment, user settings, user preferences, data tagging based on role, context associated with role for data tagging, etc.

The intelligent component 602 can employ value of information (VOI) computation in order to identify roles, role-based models, rights, privileges, assignments, and the like. For instance, by utilizing VOI computation, the most ideal and/or appropriate role can be determined. For example, by providing a VOI computation, a user may value a particular portion of information more than another which can be indicative of a particular role for assignment. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The role component 102 can further utilize a presentation component 604 that provides various types of user interfaces to facilitate interaction between a user and any component coupled to the role component 102. As depicted, the presentation component 604 is a separate entity that can be utilized with the role component 102. However, it is to be appreciated that the presentation component 604 and/or similar view components can be incorporated into the role component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the role component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
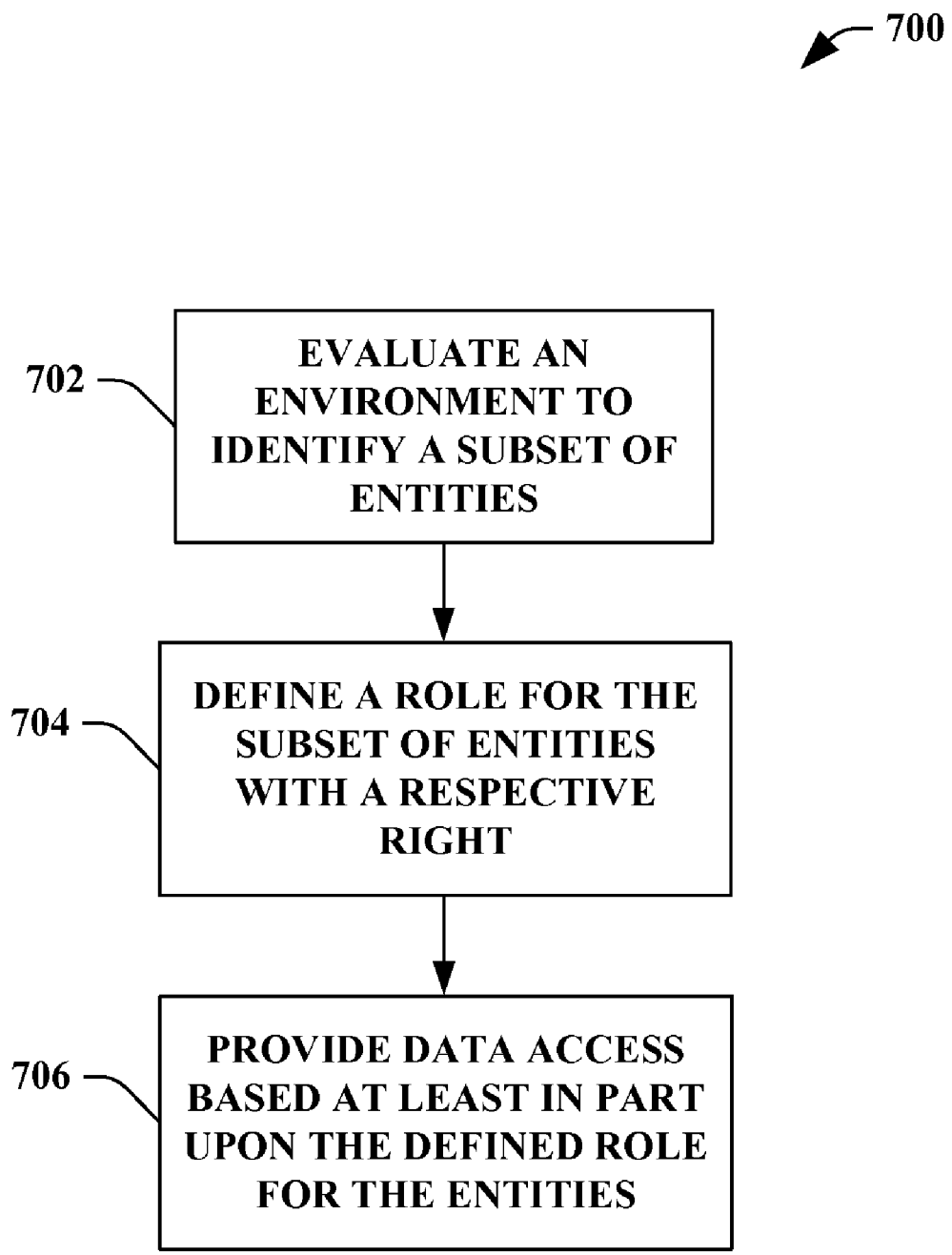
FIG. 7 illustrates an exemplary methodology for evaluating an environment to identify at least one role utilized for data accessibility.
Figure 8:
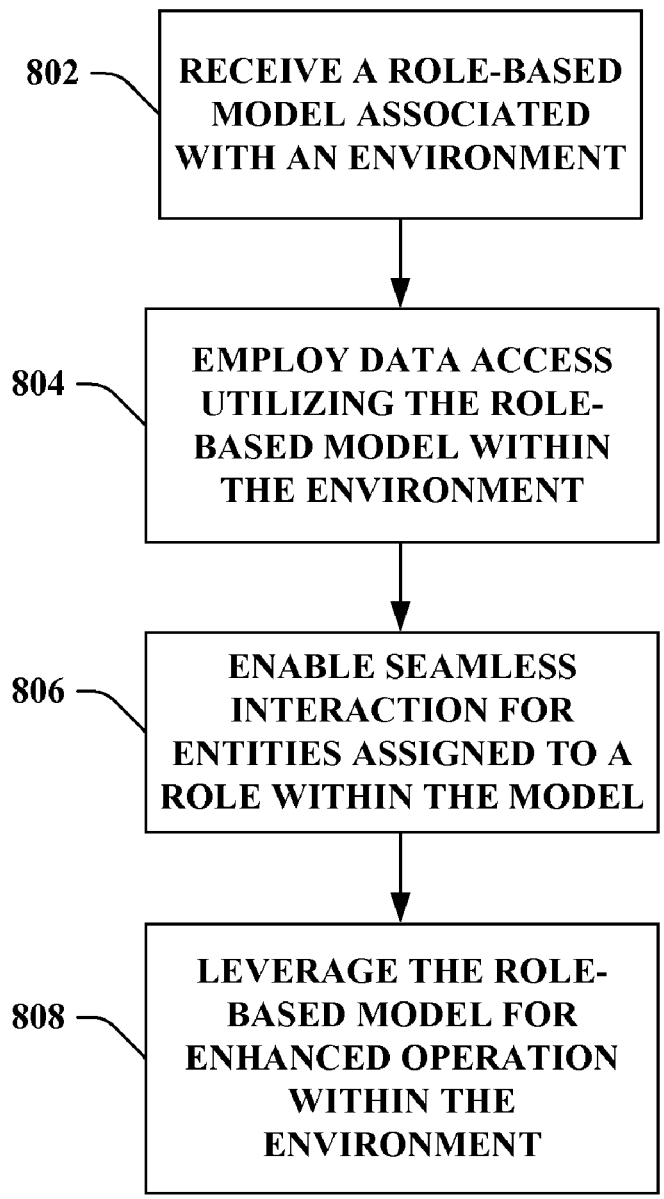
FIG. 8 illustrates an exemplary methodology that facilitates implementing data access within an environment based upon a role with at least one defined right.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates evaluating an environment to identify at least one role utilized for data accessibility. At reference numeral 702, an environment can be evaluated to identify a subset of entities. In particular, the subset of entities that can be identified can have at least one substantially similar characteristics associated with a position or status within the environment. For example, a collection of employees within a business environment can include a substantially similar position or status based on tenure (e.g., years of experience, years at the specific business environment, etc.).

At reference numeral 704, a role can be defined for the subset of entities with a respective right. The role can correlate to the position or status of the subset of entities, wherein the right can correspond to data access or availability for such particular status or position. At reference numeral 706, data access can be provided based at least in part upon the defined role for the entities. For instance, a level one role can correspond to one year of experience for a business environment, wherein data access can be connected to such role. Thus, having a level one role can provide seamless data access for appropriate data within the environment (e.g., data targeted for the level one role or an employee with one year of experience).

FIG. 8 illustrates a method 800 for implementing data access within an environment based upon a role with at least one defined right. At reference numeral 802, a role-based model associated with an environment can be received. For example, the role-based model can be created manually, automatically, and/or any suitable combination thereof. Moreover, the role-based model can include two or more roles that correlate to positions or statuses related to the environment. It is to be appreciated that the position or status within the environment can be any suitable rank or tier related to a hierarchical organization of entities within such environment. It is to be further appreciated that the environment can be any suitable collection of entities (e.g., user, device, machine, group, department, business, etc.) that can be organized in a particular manner. For example, the environment can be a business, company, a network, an enterprise, a social network, a home, a server, an application, a machine, a device, and/or any other environment that can be partitioned into a subset having similar position or status.

At reference numeral 804, data access can be employed within the environment utilizing the role-based model. The data access for each individual or entity within the environment can be in accordance with rights or privileges related to the assigned role. At reference numeral 806, seamless interaction for entities assigned to a role within the model can be enabled. In other words, a plurality of users or entities can seamlessly interact, hand-off, share, distribute, etc. data within the environment based on each user or entity logging into a role. At reference numeral 808, the role-based model can be leveraged for enhanced operation within the environment. For example, devices, components, software, hardware, applications, etc. within the environment can leverage the role-based model and defined roles in order to enhance operation thereof.

Figure 9:
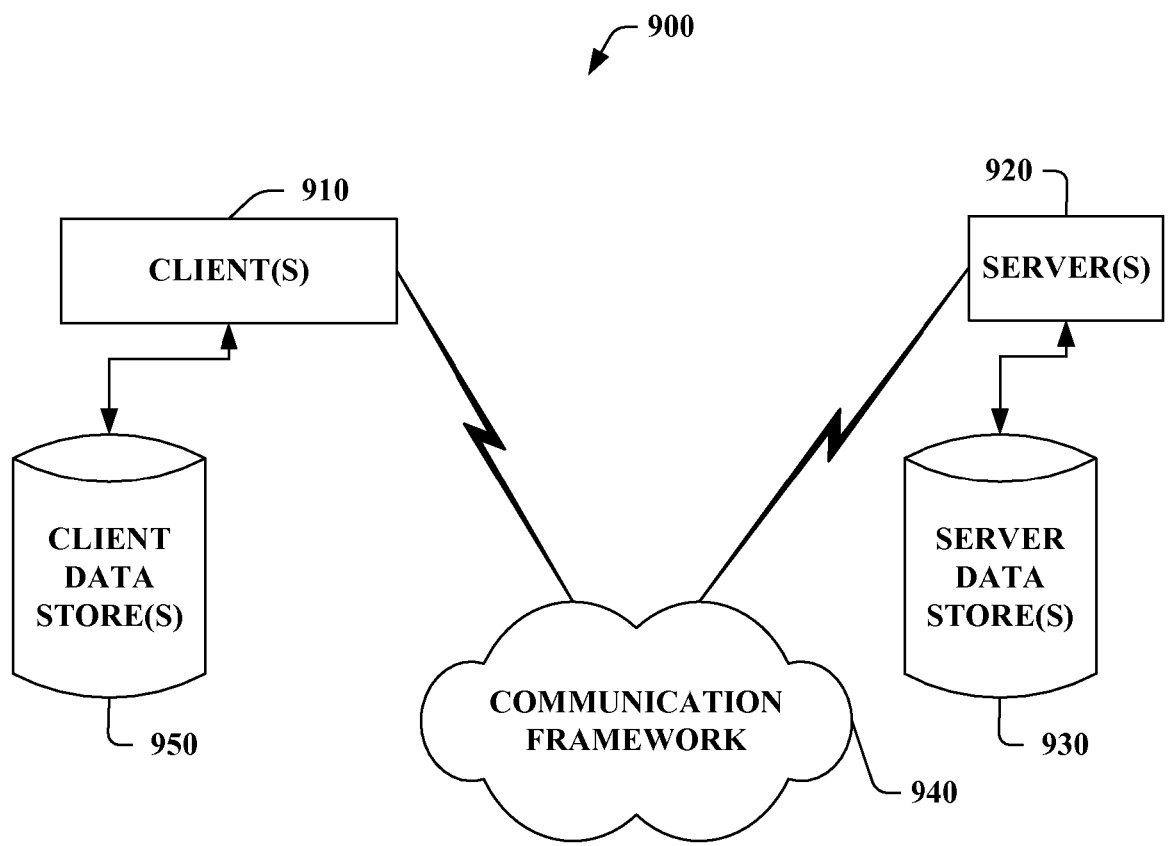
FIG. 9 illustrates an exemplary networking environment, wherein the novel aspects of the claimed subject matter can be employed.
Figure 10:
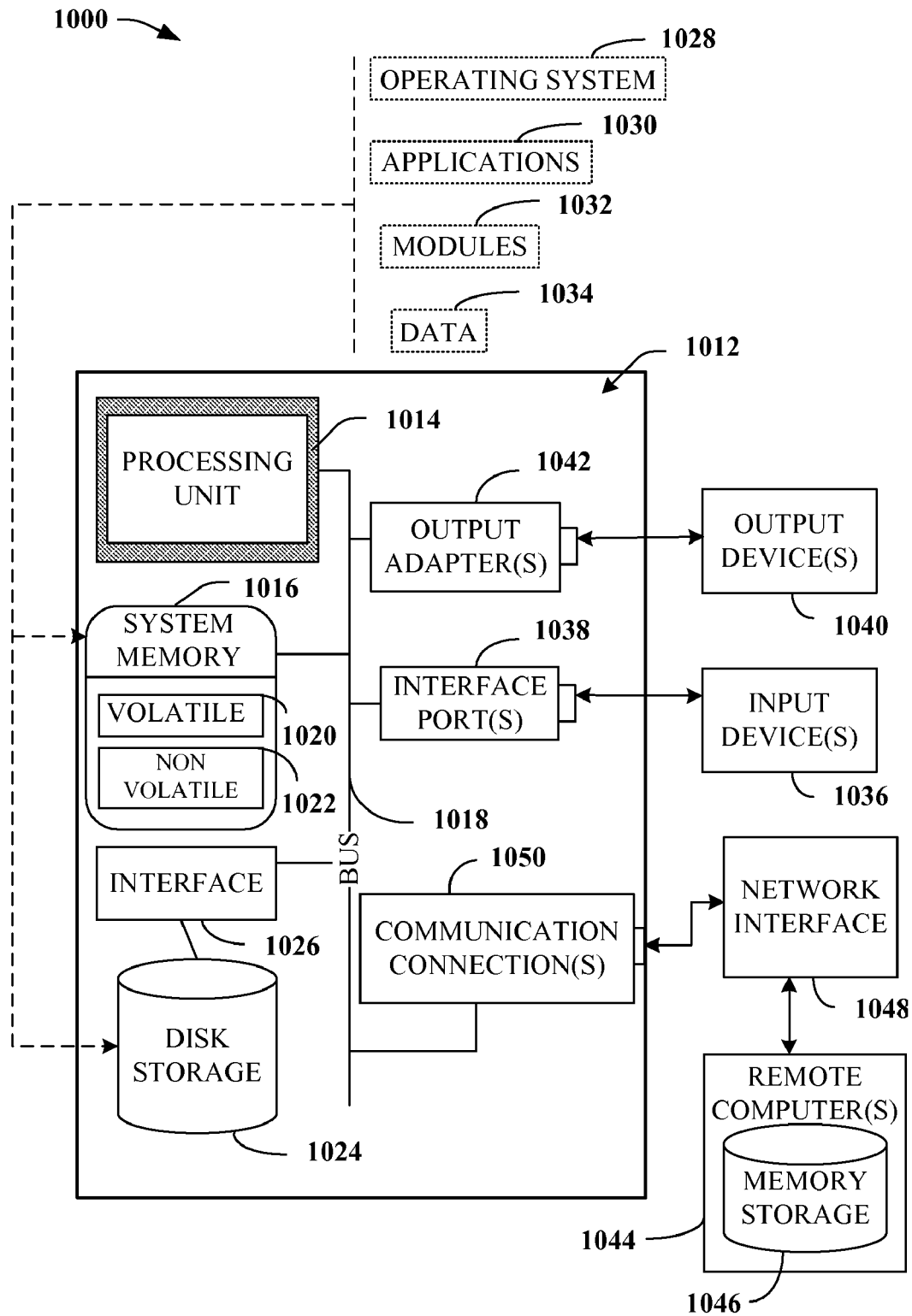
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, role component that employs data distribution and/or access within an environment in accordance to a role with respective rights, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates managing data within an environment, comprising:
    an interface component that receives a role-based model reflective of at least one position within an environment, the environment including a plurality of entities within an organized hierarchy and at least one of a business, a company, a network, an enterprise, a social network, a home, a server, an application, a machine, a device, a component, a portion of hardware, a portion of software, or a portion of the application, wherein the role-based model includes at least one role assigned to an entity of the plurality of entities, the at least one role being indicative of a position of the entity of the plurality of entities within the environment; and
    a role component that provides data access to the entity of the plurality of entities within the environment in accordance with the at least one role assigned to the entity of the plurality of entities.

2. The system of claim 1, an evaluation component that examines the environment to identify the at least one position to automatically generate the role-based model based at least in part upon the examination.

3. The system of claim 2, wherein the evaluation component creates a role based on the examination, and the created role is assigned to at least one user within the environment and includes at least one of a right or an asset ownership for data associated with the environment.

4. The system of claim 3, wherein the created role is accessible by a disparate user in which the data associated with the environment is seamlessly shared between the at least one user and the disparate user utilizing the created role, and wherein the created role enables uniform data access based on role assignment.

5. The system of claim 1, the at least one role is created based on the position of the entity of the plurality of entities and comprises a specific subset of the plurality of entities within the environment having at least one common characteristic.

6. The system of claim 1, wherein the environment leverages the at least one role to provide enhanced operation of at least one of the machine, the device, the component, the portion of hardware, the portion of software, or the portion of the application.

7. The system of claim 1, wherein the at least one role is utilized to enhance data distribution in connection with at least one of an email, a voicemail, a portion of calendar data, a portion of contact information, a website, a bookmark, a business contact, an application, a portion of department information, a portion of company information, a protocol, a portion of handbook information, a chat application, a social network, or an instant messaging application.

8. The system of claim 1, further comprising a manager component that configures at least one of the at least one role, an assignment of the entity of the plurality of entities to the at least one role, the role-based model, a right for the at least one role, and an asset ownership for the at least one role.

9. The system of claim 1, wherein the role component tags a portion of data within the environment based on interaction from the entity of the plurality of entities and respective role assigned thereto.

10. The system of claim 1, wherein the role component distributes an advertisement based on the at least one role assigned to the entity of the plurality of entities.

11. The system of claim 1, wherein the role component incorporates a portion of context related to data access by the entity of the plurality of entities assigned to the at least one role.

12. The system of claim 1, further comprising a log component that tracks at least one of the at least one role, a user log in, a user log out, a portion of data access, the at least one position within the environment, a role transition, an automatically identified role, a right associated with the at least one role, an assignment of the at least one role, or a manipulation to the role-based model.

13. The system of claim 1, further comprising a search component that queries a portion of data.

14. The system of claim 13, the portion of data relates to at least one of a portion of environment data, a portion of role associated data, a right, a portion of entity data, a portion of position data, a portion of remote data, a portion of local data, or a portion of data related to the role-based model.

15. A computer-implemented method that facilitates distributing data within an environment in a uniform matter, comprising:
    evaluating an environment to identify a subset of entities;
    receiving a role-based model associated with the environment;
    defining a role for the subset of entities with a respective right;
    providing data access based at least in part upon the defined role for the subset of entities;
    enabling seamless interaction for the subset of entities assigned to the defined role within the role-based model; and
    leveraging at least one role for enhanced operation within the environment.

16. The method of claim 15, wherein the defined role is accessible by a disparate user in which data associated with the environment is seamlessly shared between the subset of entities and the disparate user utilizing the defined role, and wherein the defined role enables uniform data access based on role assignment.

17. A computer-implemented method that facilitates enhancing data distribution, comprising:

examining an environment to identify at least one position and automatically generating a role-based model based at least in part upon the examining;

receiving the role-based model reflective of the at least one position within the environment, the environment including a plurality of entities within an organized hierarchy;

assigning at least one role to an entity of the plurality of entities within the role-based model, the assigning being indicative of a position of the entity of the plurality of entities within the environment; and providing data access to the entity of the plurality of entities within the environment in accordance with the at least one role assigned to the entity of the plurality of entities.

* * * * *